Dec. 22, 1959     K. F. SCHLICHTING     2,917,772
APPARATUS FOR FEEDING FISH ACCURATELY CENTERED TO
THE DRESSING TOOLS OF FISH DRESSING MACHINES
Filed Aug. 8, 1956                                 3 Sheets-Sheet 3

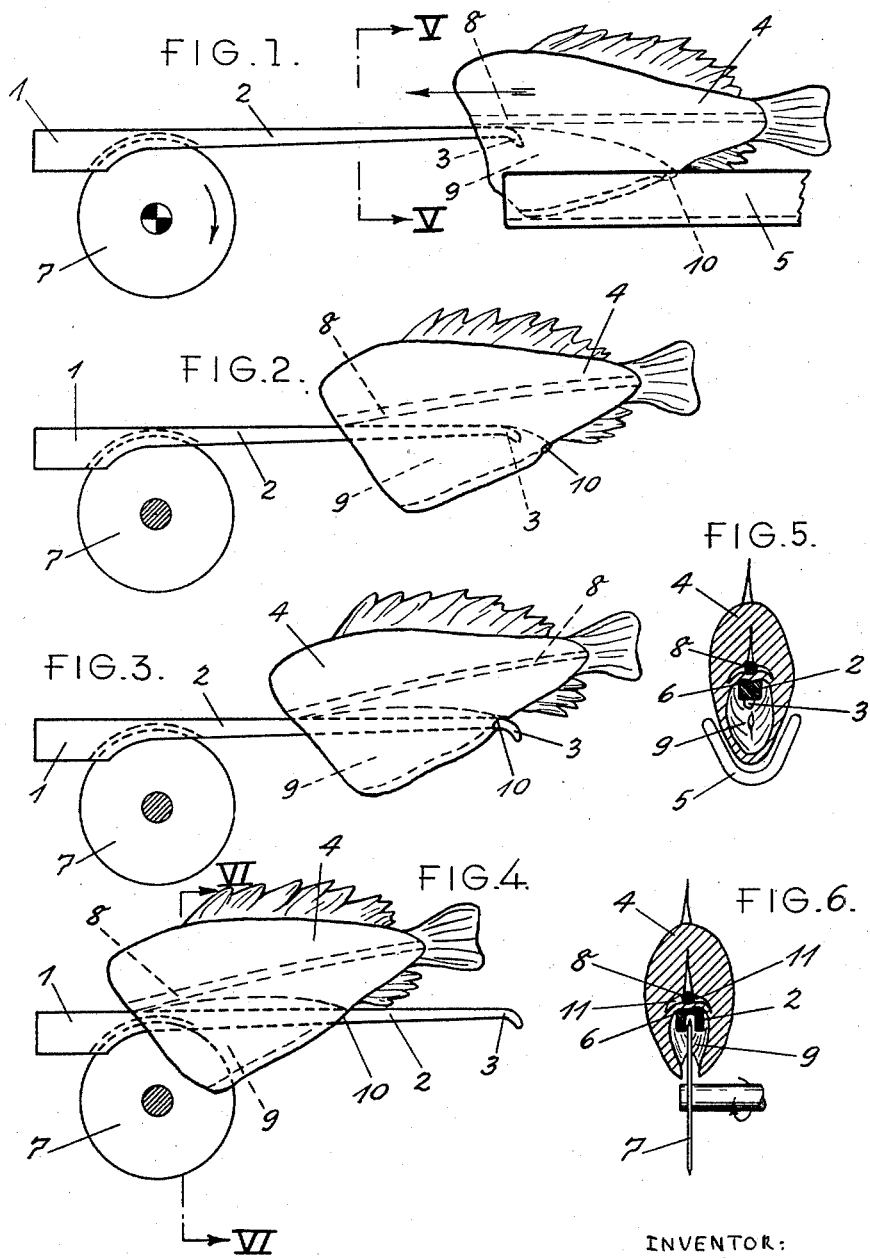

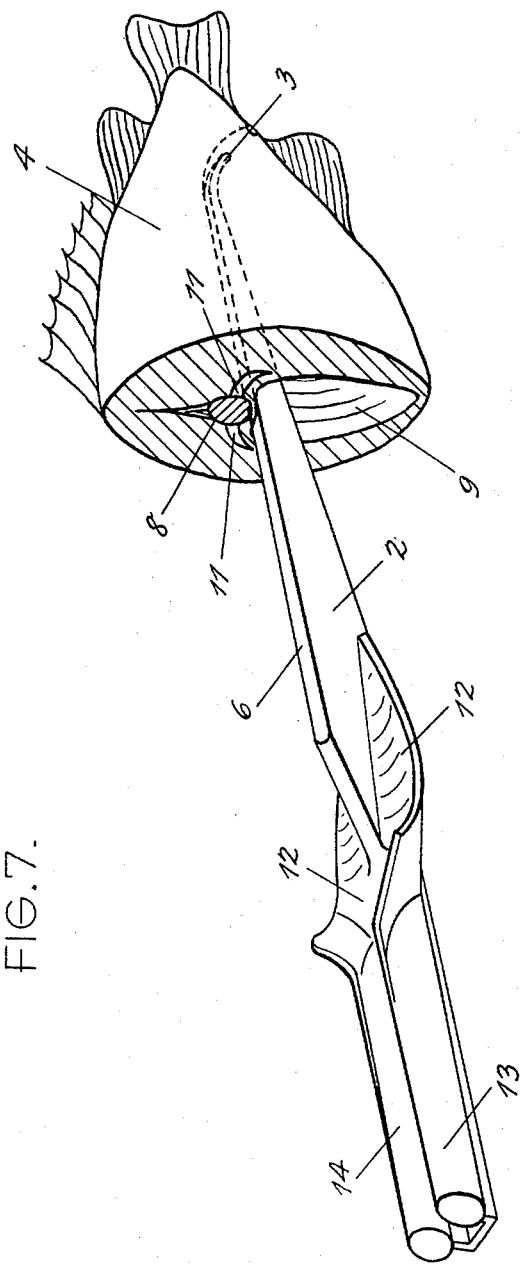

INVENTOR:
K. F. Schlichting
BY
Richards & Geier
ATTORNEYS

United States Patent Office 2,917,772
Patented Dec. 22, 1959

2,917,772

APPARATUS FOR FEEDING FISH ACCURATELY CENTERED TO THE DRESSING TOOLS OF FISH DRESSING MACHINES

Karl Friedrich Schlichting, Lubeck, Germany, assignor to Firma Nordischer Maschinenbau Rud. Baader, Lubeck, Germany Application August 8, 1956, Serial No. 602,717

Claims priority, application Germany August 10, 1955

5 Claims. (Cl. 17—2)

The invention relates to a method for feeding fish accurately centered to the dressing tools of a fish dressing machine and consists in that the front end of the belly cavity of the fish opened up by cutting off the head runs on to a spike and whilst on the spike and supported in the vicinity of the belly cavity at both ends thereof are saddled in such a manner that on reaching the first dressing tool they are accurately centered in the vertical and horizontal sense.

The feeding of fish accurately centered to the dressing tools of a fish dressing machine presents considerable difficulties when the fish are of compact shape with a relatively round body cross-section, because they offer few possibilities for the uniform engagement of the guiding members which can accurately center the position in the vertical and horizontal sense.

It has now been found that the belly cavity of the fish is an excellent place for applying a guide, providing the guide is brought to bear on the upper boundary edge of the belly cavity, that is just below the backbone, in the form of a spike tapering towards its front end and on which the fish is saddled. The upper boundary at the head and the tail end of the belly cavity then rests on the spike so that the tail part of the fish is raised. As the upper boundary at the front end of the belly cavity is situated just below the backbone, the accurate position in vertical sense is easily assured.

The accurate position in horizontal sense is determined by the shape of the belly cavity, because the spike, increasing in cross-section, cooperates with the upper part of the side walls of the belly cavity. This accurate position in horizontal position is already assured when the fish is not only decapitated but also has an opened up and spread belly cavity. However, it is even more certainly assured if the fish is only decapitated and the belly cavity is still closed except where the front part is opened up by the cutting off of the head of the fish. In this case the guts of the fish and in particular the roe bags, etc., located on each side of the vertical plane of the fish form in conjunction with the spike, an ideal means of centering horizontally.

Particularly when the belly cavity of the fish is not opened up, the present method offers the best opportunity for cutting open the belly cavity along the lower edge thereof after the fish has been saddled, because being supported at its two ends the belly cavity lies entirely below the spike guide so that the belly cavity knife or, if a belly strip is to be cut out, the belly cavity knives can open the entire under edge of the belly cavity unhindered.

The front, preferably downwardly bent point of the spike passes out at the end of the belly cavity in the case of fish with opened up belly cavity, and through the anus in the case of fish the belly cavity of which is not opened up.

However, the method according to the invention enables the fish to be not only centered in vertical and horizontal position, but also to be centered so that it is secured against turning about its longitudinal axis. It is particularly difficult to prevent turning about the longitudinal axis in the case of fish having a relatively round cross-section, but this can be carried out very easily by saddling on a spike in the region of the belly cavity, if the saddling is effected at least in the front region of the belly cavity on both sides of the backbone, because the two saddle blades bear firmly against the arched wall formed by the ribs springing from the backbone and thereby prevent any possibility of the fish turning about its longitudinal axis.

Should the fish slip out of its central position on the saddle, which is easily possible particularly after being worked by a dressing tool, it can once more be brought back quite easily into its central position if the fish is automatically fed to a switch which returns the fish into its central position and conducts it in this position to the guide of the next tool. It is evident that this switch only has a centering effect on fish which have slipped out of their central position, whereas the fish which are accurately centered slide past the switch without being influenced thereby.

To ensure that the spike reliably penetrates the belly cavity directly below the backbone and to prevent all possibility of the point of the spike coming into contact with the flesh surface exposed by cutting off the head of the fish, or with the backbone, the height position in which the fish is fed to the spike can be adjusted so that the point of the spike always pierces the fish at the desired spot. The adjustment of the height of the fish can be effected by the fish itself which controls the adjustment in vertical direction of the device, for example a guide trough, which feeds the fish to the spike. It can, however, also be effected by the spike itself, preferably so that the spike is swung into operative position from below in dependency upon the passing nape portion of the fish. For this purpose use is made of the fact that an inclined surface, sloping from the top at the front to the bottom towards the rear, is produced by the cutting off of the head. If the advancing nape portion is allowed to control the turning of the fish, the spike in swinging upwards enters in any case the belly cavity and bears against the upper wall or boundary of the belly cavity just below the backbone.

The apparatus for carrying out the method consists of a saddle guide with a spike tapering towards its front end with its extremity bent slightly downwards, this spike being of such length that the front and rear ends of the belly cavity of the fish rest thereon.

To prevent the fish from turning about its longitudinal axis, the apex of the saddle of the spike is provided with a trough-shaped guide track, the two longitudinal edges of which serve as saddle blades for saddling the fish on both sides of the backbone. These two saddle blades bear against the arch formed by the ribs springing from the backbone.

For returning into its central position a fish which has slipped out of position on the saddle guide by guiding the fish over a switch, the trough-shaped guide path has one or several gaps, guide ribs being arranged on both sides at the end of a section of the guide path, which ribs terminate in the next following section of the guide path. In this manner any fish which has slipped out of its central position is accurately returned into its proper position for the next dressing operation.

To ensure that the spike reliably enters the belly cavity, the point of the spike is constructed to fold downwards and cooperates with a feeler engaging the fish, so that, when the feeler lifts, a locking device holding the spike in its inoperative position liberates the spike so that it can move into its operative position. The spike is then preferably acted upon by a second locking device which, when the spike is swung into its operative position, holds it in this position until the feeler returns into its inoperative position.

Several forms of construction of the device for carrying out the method according to the invention are illustrated by way of example in the accompanying drawings, in which Figs. 1 to 4 show the spike guide with a fish in various phases of the saddling operation;

Fig. 5 is a section on line V—V of Fig. 1;

Fig. 6 is a section on line VI—VI of Fig. 4;

Fig. 7 shows on an enlarged scale a spike guide with a switch for returning into the proper position a fish which has slipped out of its central position.

Figure 8:
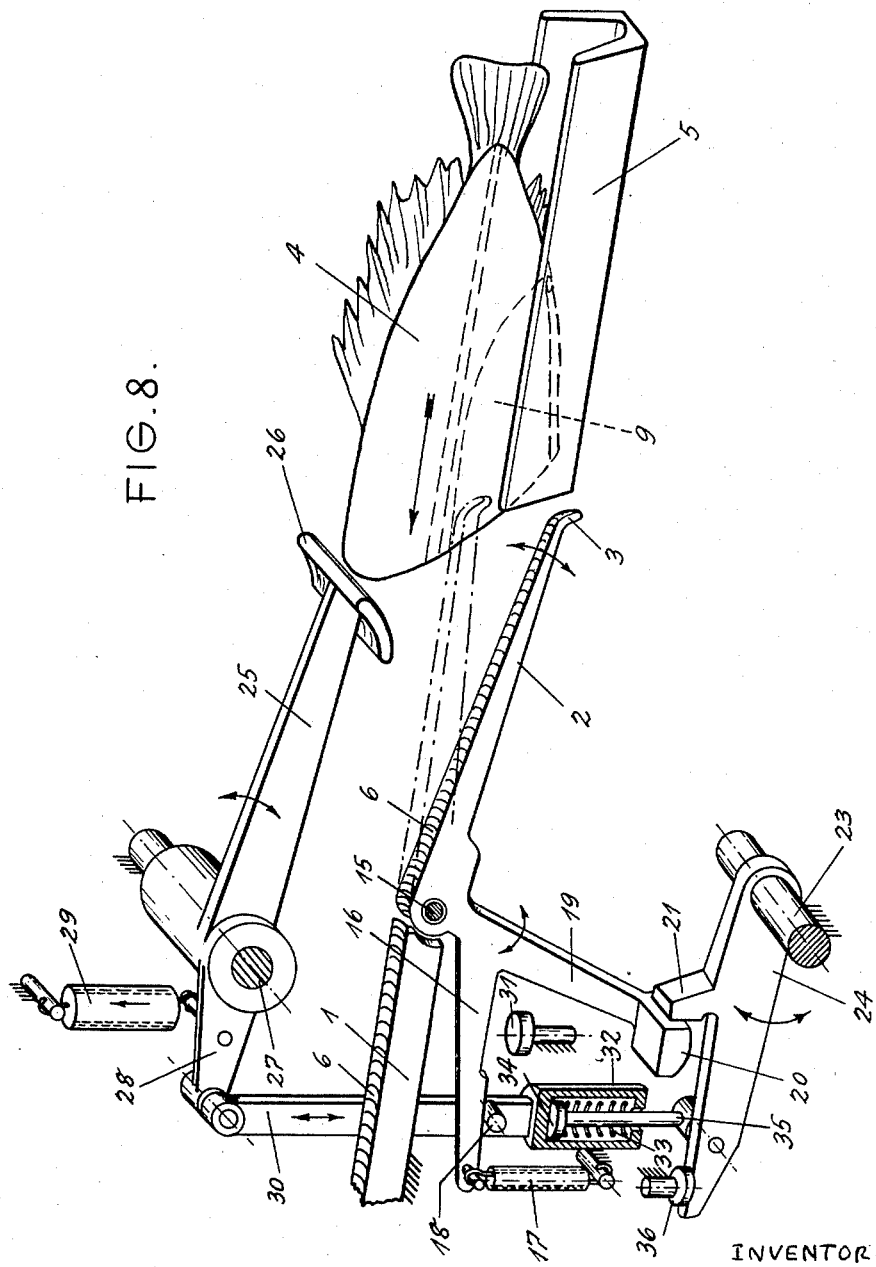
Fig. 8 shows a downwardly folded spike guide with a feeler cooperating with it, with some parts broken away and other parts shown in section.

In Figs. 1 to 4 the saddle guide 1, the cross-sectional shape of which is shown more clearly in Figs. 5 and 6, has at its front end a spike 2 which tapers gradually in cross-section towards the front and the point 3 of which is bent downwards. For introducing the fish a trough 5 is provided in which the fish are pushed towards the spike either by hand or with the aid of mechanical means (not shown). As can be seen from Figs. 5 and 6 (see also Fig. 7) the spike 2 has a trough-shaped guide path 6 formed by longitudinal edges 6a and 6b forming saddle blades for saddling the fish. A rotary circular knife 7 is mounted under the rear end of the spike 2.

The apparatus operates in the following manner:

If, according to Fig. 1, a fish 4 is pushed towards the point 3 of the spike 2, this penetrates the belly cavity 9, opened by cutting off the head of the fish, below the backbone 8 and moves along the upper wall or boundary of the cavity as shown in Fig. 2. In so doing the tail portion of the fish is raised slightly owing to the curvature of the upper boundary of the belly cavity. Towards the rear end of the belly cavity 9 the tail end of the fish lifts more steeply owing to the steeper curve of the belly cavity wall or boundary until, as shown in Fig. 3, the point of the spike passes out of the belly cavity 9 through the anus 10. As can be clearly seen from Fig. 3, the fish is then completely saddled in the region of the belly cavity and is supported at both ends of the belly cavity so that only the whole of the belly cavity portion of the fish is situated below the spike 2.

This position, as can be seen from Fig. 4, is particularly advantageous if the belly cavity is still closed with the exception of the front end thereof opened by the cut removing the head, because the belly cavity knife 7, as the fish is moved on, cuts open in a perfect manner the lower edge of the belly cavity from the front end up to the anus 10 without in any way entering the tail portion.

As can be seen from Figs. 5 and 6 and also from Fig. 7, which will be described later, the fish is supported by the trough-shaped guide path 6 in the front end of the belly cavity 9 in such a perfect manner on the rib arches 11 on both sides of the backbone 8 that the fish is secured against turning about its longitudinal axis.

In the construction illustrated in Fig. 7, the parts 2, 3 and 6 are the same as in Figs. 1 to 6. The parts 8, 9 and 11 of the fish 4 are designated by the same reference numerals. Guide ribs 12 extend from both sides of the spike portion of the guide and converge towards the middle in forward direction and extend in the form of another saddle part 13 which is wider than the spike 2 and also constructed as a trough-shaped guide path 14. A gap 12a separates the guide path 6 from the guide path 14. If, as the fish is moved over the spike 2, the lower edge of the backbone 8 at the front end of the belly cavity, slips off the guide path 6 it lands on the ribs 12 on the right and left thereof and is guided by these back to the middle and presented, accurately centered, to the trough-shaped guide path 14 of the part 13 of the guide.

The form of construction of the apparatus illustrated in Fig. 8 serves for preventing the point 3 of the spike 2 from encountering the flesh of the fish or the backbone thereof when the vertical position of the fish does not register with the position of the spike for penetrating the belly cavity. The fish 4 is here also pushed forward in the trough 5. The spike 2 of the guide 1 likewise provided with a guide trough 6 and a downwardly bent point 3, can turn about a pivot 15 and is acted upon by a spring 17 engaging a lever arm 16 of the spike 2 and tending to pull the spike into its operative position shown in dot-dash lines. In the inoperative position shown in full lines, the spike 2 is held by a stop 18 which prevents the lever arm 16 from moving. The spike 2 is also locked by an abutment 20 on a lever arm 19 of the spike 2, which abutment strikes against a projection 21 on a rocker lever 24 capable of turning about a pivot 23 and actuated in the matter hereinafter described.

A feeler 25 is arranged above the spike guide 1, 2 and provided with a feeler plate 26 and capable of turning about a pivot 27. The feeler 25 extends on the other side of the pivot 27 in the form of a lever arm 28 engaged by a spring 29 which tends to swing the feeler 25 downwards into its inoperative position. A pull-rod 30 engages the lever arm 28 and carries a stop 18 blocking the movement of the spike 2. The movement of the spike 2 into its operative position is limited by a fixed stop 31 against which the lever arm 16 strikes during its downward movement. A sleeve 32 is mounted on the lower end of the pull-rod 30 and a piston 34 acted upon by a spring 33 slides in this sleeve 32 and the piston rod 35 engages the swing lever 24. By this spring loaded piston arrangement the lever 24 is always urged upwards so that the ledge 20 and stop 21 prevent the spike from moving out of its inoperative position. The downward movement of the lever 24 is limited by a fixed stop 36.

As soon as the fish encounters the feeler plate 26, the feeler 25 is lifted with the result that the pull-rod descends. As a result the stop 18 also descends and releases the movement of the lever arm 16. At the same time the swing lever 24 is pressed downwards by the likewise descending now rigid spring-loaded piston 34, so that the stop 21 is swung out of the path of the ledge 20. The spike 2 is now free to swing into its operative position under the action of the spring 17 until the arm 16 comes into contact with the stop 31. The spike 2 has then penetrated the belly cavity 9 to the upper boundary wall thereof directly under the backbone, with the result that the entrance of the spike into the belly cavity 9 is ensured in any case.

As no means are provided for blocking the movement of the arm 16 in upward direction, it could move upwards against the action of the spring 17 if, due to the spike 2 encountering some resistance or other, the spike had the tendency to yield in downward direction. The tendency of the spike 2 to yield is, however, prevented by the cooperation of the ledge 20 and stop 21 which together form a block opposing the swinging movement of the arm 19. This block is released when, by the descent of the feeler 25 as soon as it has passed the fish 4, the pull-rod 30 with its stop 18 are pulled upwards under the action of the spring 29, whereby, due to the strong pressure exerted by the abutment 18 on the arm 16, the ledge is drawn over the stop 21 so that the spike is pulled into its inoperative position.

The directions of movements of the individual parts are indicated by arrows, the black arrow heads indicating the direction of movement into the operative position and the white arrow heads the movements into the inoperative position. In Fig. 8 all the parts are shown in inoperative position.

I claim:

1. In an apparatus for feeding fish to the dressing tools of a fish dressing machine, a device for accurately centering the fish during the feeding, said device comprising an elongated guide and a spike constituting a continuation of said guide and having a downwardly bent forward end, said spike tapering toward said forward end and being of a length which is at least equal to the distance between the front and rear ends of the belly cavity of the fish being fed, whereby said spike supports said fish in a saddled position on the front and rear ends of the belly cavity thereof.

2. In an apparatus for feeding fish to the dressing tools of a fish dressing machine, a device for accurately centering the fish during the feeding, said device comprising an elongated guide and a spike constituting a continuation of said guide and having a downwardly bent forward end and a top portion, said spike tapering toward said forward end and being of a length which is at least equal to the distance between the front and rear ends of the belly cavity of the fish being fed, whereby said spike supports said fish in a saddled position on the front and rear ends of the belly cavity thereof, said top portion having two longitudinal edges forming saddle blades for saddling the fish and a trough-shaped depression between said longitudinal edges, whereby said longitudinal edges and said trough-shaped depression form a guide path for the fish.

3. In an apparatus for feeding fish to the dressing tools of a fish dressing machine, a device for accurately centering the fish during the feeding, said device comprising an elongated guide and a spike constituting a continuation of said guide and having a downwardly bent forward end and a top portion, said spike tapering toward said forward end and being of a length which is at least equal to the distance between the front and rear ends of the belly cavity of the fish being fed, whereby said spike supports said fish in a saddled position on the front and rear ends of the belly cavity thereof, said top portion having two aligned guide paths and a gap between said guide paths, each of said guide paths consisting of two longitudinal edges forming saddle blades for saddling the fish and a trough-shaped depression between said longitudinal edges, and two-longitudinal guide ribs extending across said gap between said two guide paths.

4. In an apparatus for feeding fish to the dressing tools of a fish dressing machine, a device for accurately centering the fish during the feeding, said device comprising an elongated guide and a spike constituting a continuation of said guide and having a downwardly bent forward end, said spike tapering toward said forward end and being of a length which is at least equal to the distance between the front and rear ends of the belly cavity of the fish being fed, whereby said spike supports said fish in a saddled position on the front and rear ends of the belly cavity thereof, wherein the front portion of the spike is foldable in downward direction, a locking device for locking said spike in its lowered inoperative position, a fish-actuated feeler operatively connected with said locking device for releasing said locking device, and means for moving said spike into its operative position.

5. Apparatus as set forth in claim 4, comprising a second locking device for locking said spike in its raised operative position.

References Cited in the file of this patent
UNITED STATES PATENTS

| | | |
|---|---|---|
| 1,078,720 | Cleveland | Nov. 18, 1913 |
| 2,625,708 | Oates | Jan. 20, 1953 |
| 2,637,064 | Miller | May 5, 1953 |
| 2,649,613 | Danielsson | Aug. 25, 1953 |
| 2,657,424 | Biddinger et al. | Nov. 3, 1953 |
| 2,680,876 | Oates | June 15, 1954 |
| 2,685,705 | Streich et al. | Aug. 10, 1954 |
| 2,845,654 | Deal | Aug. 5, 1958 |